United States Patent Office 3,414,566
Patented Dec. 3, 1968

3,414,566
17 - SUBSTITUTED - 3α,5 - CYCLO - 6β,19 - OXIDO-5α-STEROIDS AND PROCESS FOR PREPARING THE SAME
Katsumi Tanabe, Rinji Takasaki, Ryozo Hayashi, Yasuhiro Morisawa, and Teruo Hashimoto, Tokyo, Japan, assignors to Sankyo Company Limited, Tokyo, Japan
No Drawing. Continuation of application Ser. No. 489,756, Sept. 23, 1965. This application Dec. 21, 1966, Ser. No. 603,682
Claims priority, application Japan, Sept. 28, 1964, 39/55,448
7 Claims. (Cl. 260—239.55)

This is a continuation of copending United States patent application Ser. No. 489,756, filed Sept. 23, 1965, and now abandoned.

This invention relates to novel steroids and to a process for the preparation thereof.

More particularly, this invention relates to a new class of 17-substituted-3α,5-cyclo-6β,19-oxido-5α-steroids having the formula

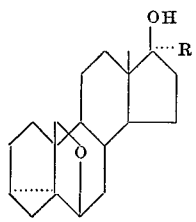

(I)

wherein R represents a straight or branched alkyl group containing 1~6 carbon atoms such as methyl, ethyl, n-propyl, isopropyl, n-butyl, sec.-butyl, t.-pentyl or isohexyl, an alkenyl group containing 2~6 carbon atoms such as vinyl, propenyl, butenyl, pentenyl or hexenyl, an alkynyl group containing 2~6 carbon atoms such as ethynyl, propynyl, butynyl or hexynyl, or a halogenoalkynyl group containing 2~6 carbon atoms such as chloroethynyl or bromopropynyl and a process for preparing the same.

The steroidal compounds having the above Formula I prepared by the process of this invention are novel compounds unknown in the prior art and are found to be useful as an intermediate for the synthesis of 19-norsteroids which have recently been used for the therapeutic purposes as progestational hormones, estrogenic hormones or anabolic hormones. For instance, the steroidal compounds having the above Formula I may be easily converted with alkylsulfoxide to the 3-keto-Δ⁴-steroids having the formula

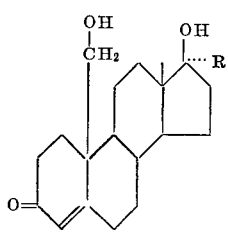

(I')

wherein R is as defined above, due to the particular chemical properties based upon the 3,5-cyclopropane ring and the 6β,19-oxido linkage, and the latter compounds may be treated with alcoholic alkali to produce the 19-norsteroids having the formula

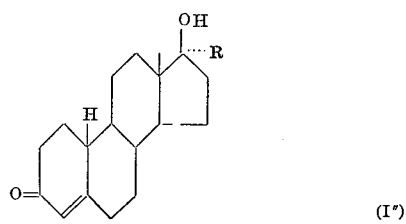

(I'')

wherein R is as defined above, which are known to be useful as sexual hormones or anabolic hormones.

Therefore, it is an object of this invention to provide the novel steroids having the above Formula I which are useful as an intermediate for the synthesis of valuable 19-norsteroids.

Another object of this invention is to provide a process for the preparation of the novel steroids having the above Formula I.

Other objects of this invention will become apparent from the contents of the specification hereinafter disclosed.

According to the process of this invention, the steroidal compounds having the above Formula I can be prepared by reacting 6β,19-oxido-3α,5-cyclo-5α-androstane-17-one represented by the following formula

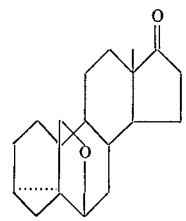

(II)

with an aliphatic hydrocarbon metallic compound.

The term "aliphatic hydrocarbon metallic compound" used herein is intended to include the organometallic compound having the formula <p align="center">RMgX         (III)</p>

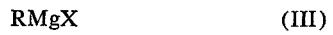

wherein R is as defined above and X is halogen atom; such as alkyl (or alkenyl) magnesium halides, for example, methyl, ethyl, isopropyl, sec.-butyl, t.-pentyl, isohexyl, propenyl, butenyl and hexenyl magnesium bromides and iodides or alkynyl magnesium halides, for example, ethynyl, propynyl, butynyl and hexynyl magnesium bromides and iodides, and the organo metallic compound having the formula <p align="center">RM         (IV)</p>

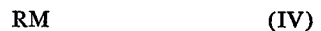

wherein R is as defined above and M is a metal atom; such as lithium and cadmium alkyls and alkenyls, lithium, cadmium, potassium and sodium alkyl acetylides and lithium, cadmium, potassium and sodium halogenoacetylides.

In carrying out the process of this invention, where the organometallic compound having the above Formula III is employed as a reagent, the reaction may be conveniently conducted by the same procedure as that in the usual Grignard reaction well-known to those skilled in the art. The reaction conditions may also be similar to those in the Grignard reaction.

In one of the preferred embodiments of the process of this invention, a solution containing the organometallic compound having the above Formula III is first prepared by adding metallic magnesium in a suitable solvent such as ethers and then adding dropwise thereto a solution of the desired halide in a suitable solvent such as ethers. To the resulting solution is added a solution of a starting steroid in a suitable solvent such as ethers, so that the reaction of a starting steroid with an organometallic compound may be conducted in situ. After completion of the reaction, the reaction product may be recovered from the reaction mixture by a known procedure. For instance, sufficient water or an aqueous ammonium chloride solution to decompose the excess of the unreacted reagent is added to the reaction mixture, and the organic solvent layer is separated, washed with water, dried and then the solvent is removed to give the desired product.

Where the organometallic compound having the above Formula IV is employed as a reagent, the starting steroid may be subjected to the direct reaction with the organometallic compound having the above Formula IV, but, practically, it is preferable to react the required organometallic compound that has been formed in the reaction mixture with a starting steroid in situ, and most preferable when the organometallic compound having the above Formation IV in which R is an alkynyl group is employed. In such a case, vairous known procedures may be available and, in general, the reaction may be preferably accomplished by using any of the following three known procedures; treatment of a starting steroid with an alkyne such as acetylene, propyne, butyne, pentyne or dichloroacetylene, particularly a gaseous alkyne such as acetylene, propyne or butyne in the presence of an alcoholate such as potassium t.-butoxide or potassium t.-amyloxide; treatment of a starting steroid with an alkyne such as those referred to as above in the presence of an alkali metal such as lithium or sodium and in the presence of liquid ammonia; and treatment of a starting steroid with a halogenoalkene such as ethylene dichloride in the presence of an alkali metal such as lithium or sodium and in the presence of liquid ammonia. In one of the preferred embodiments, the alcoholate prepared from the cooresponding alcohol and alkali metal is added to a suitable solvent containing alkyne, together with a solution of a starting steroid in a suitable solvent such as ethers and then into the resulting mixture is introduced a gaseous alkyne at a moderate flow rate for an appropriate time. Alternatively, an alkali metal is added to liquid ammonia and then a gaseous alkyne is introduced. To the resulting mixture is added a solution of a starting steroid in a suitable solvent such as ethers. In such a case, the reaction may be normally carried out at about —40~70° C. for about 1~6 hours. After completion of the reaction, the reaction product may be recovered from the reaction mixture by a conventional method. For instance, the reaction mixture is cooled, water or an aqueous ammonium chloride solution is added, the resulting mixture is extracted with ether, the ether extract is washed with water, dried and the ether is distilled off to obtain the desired product. Alternatively, in particular, where liquid ammonia is employed, water or an aqueous ammonium chloride solution is added to the reaction mixture, liquid ammonia and a solvent are removed, the residue is extracted with ether and the ether extract is washed with water, dried and then the ether is distilled off to obtain the desired product.

The following examples are given by way of illustration only and as not limiting the scope of this invention.

EXAMPLE 1

17α-methyl-17β-hydroxy-6β,19-oxido-3α,5-cyclo-5α-androstane

To a 1000 ml. three-necked flask equipped with a reflux condenser, an air-tight stirrer, a dropping funnel and a tube filled with calcium chloride are placed 3.1 g. (0.21 mol) of metallic magnesium and 200 ml. of dry ether and then a solution of 31 g. (0.22 mol) of methyliodide in 80 ml. of dry ether is gradually added dropwise with stirring to form methylmagnesiumiodide in situ. The flask is cooled outwardly with ice-water and a solution of 2.0 g. (0.07 mol) of 6β,19-oxido-3α,5-cyclo-5α-androstane-17-one in 200 ml. of dry ether is slowly added dropwise thereto at room temperature. The resulting mixture is allowed to stand with stirring at room temperature for 5 hours and then heated under reflux for additional 2 hours.

After completion of the reaction, the reaction mixture is cooled outwardly with ice-water, and 200 ml. of an aqueous ammonium chloride solution is gradually added dropwise with stirring to decompose excess methylmagnesium iodide. The resulting mixture is placed in a 1000 ml. separating funnel, the aqueous layer is separated out and the ether layer is washed with water until it becomes neutral. The washed ether layer is dried over anhydrous sodium sulfate and evaporated to dryness under reduced pressure to give 2.3 g. of an oily substance. The substance thus obtained is crystallized with a small amount of n-hexane and the crystalline substance is recrystallized from a mixture of benzene and n-hexane (1:3) to give 0.85 g. of the desired product as needles melting at 147~148° C. Further, the oily substance obtained from the mother liquor is chromatographed on alumina (Woelm grade III) and from the eluate with a mixture of benzene and n-hexane (3:1) is additionally obtained 1.037 g. of the desired product. Total yield: 1.887 g.; about 89% (based on the theoretical yield).

*Analysis.*—Calculated for $C_{20}H_{30}O_2$: C, 79.42; H, 10.00. Found: C, 79.25; H, 9.96.

EXAMPLE 2

17α-ethyl-17β-hydroxy-6β,19-oxido-3α,5-cyclo-5α-androstane

To the three-necked flask equipped as described in Example 1 are placed 8.5 g. of metallic magnesium and 400 ml. of dry ether and a solution of 38 g. of ethylbromide in 80 ml. of dry ether is gradually added dropwise with stirring thereto to form ethylmagnesium bromide in situ. Then, the resulting mixture is outwardly cooled with ice-water, a solution of 10 g. of 6β,19-oxido-3α,5-cyclo-5α-androstane-17-one in 200 ml. of dry ether is slowly added dropwise at room temperature and then allowed to stand at room temperature with stirring for 4 hours.

After completion of the reaction, the reaction mixture is outwardly cooled with ice-water and 300 ml. of a cold saturated aqueous ammonium chloride solution is added dropwise with stirring to decompose excess ethylmagnesium bromide. The aqueous layer is separated from the resulting mixture, extracted with ether and the combined ether extract is washed with water and then dried over anhydrous sodium sulfate. The extract is then evaporated to dryness under reduced pressure to leave 9.2 g. of the crude product, melting 175~178° C. The crude product thus obtained is recrystallized from a mixture of ether and n-hexane (1:3) to give the pure product as crystals melting at 176~178° C. Yield: about 83% (based on the theoretical yield).

*Analysis.*—Calculated for $C_{21}H_{32}O_2$: C, 79.70; H, 10.19. Found: C, 79.90; H, 10.58.

EXAMPLE 3

17α-(2′-Propenyl)-17β-hydroxy-6β,19-oxido-3α,5-cyclo-5α-androstane

To the three-necked flask equipped as described in

Example 1 are placed 3.1 g. of metallic magnesium and 180 ml. of dry ether and a solution of 27 g. of allyl bromide in 55 ml. of dry ether is gradually added dropwise with stirring to form propenyl magnesium bromide in situ. Then, the resulting mixture is outwardly cooled with ice-water and a solution of 2.0 g. of 6β, 19-oxido-3α,5-cyclo-5α-androstane-17-one in 55 ml. of dry ether is slowly added dropwise at room temperature. The resulting mixture is allowed to stand at room temperature with stirring for 4 hours and then heated under reflux for additional 2 hours.

After completion of the reaction, the reaction mixture is outwardly cooled with ice-water and 200 ml. of a saturated aqueous ammonium chloride solution is gradually added dropwise to decompose excess propenylmagnesium bromide. The aqueous layer is separated from the resulting mixture, extracted with ether and the combined ether extract is washed with water and dried over anhydrous sodium sulfate. The extract is evaporated to dryness under reduced pressure to give 2.1 g. of an oily substance. The substance thus obtained is recrystallized from n-hexane to give 1.9 g. of the desired product as prisms. Yield: about 83% (based on the theoretical yield).

Analysis.—Calculated for $C_{22}H_{32}O_2$: C, 80.44; H, 9.83. Found: C, 80.25; H, 9.61.

EXAMPLE 4

17α-Ethynyl-17β-hydroxy-6β,19-oxido-3α,5-cyclo-5α-androstane

To a 1000 ml. three-necked flask equipped with a reflux condenser, a stirrer, a dropping funnel, a gas inlet tube and a tube filled with calcium chloride is placed 200 ml. of dry ether, and, while outwardly cooling with ice-water, dry acetylene gas is introduced into the flask through the said inlet tube for 2 hours at a flow rate of 120~150 ml./min. Thereafter, a mixture consisting of potassium t.-amyloxide prepared from 45 ml. of t.-amylalcohol and 3 g. of metallic potassium, 3.0 g. of 6β,19-oxido-3α,5-cyclo-5α-androstane-17-one, 200 ml. of dry ether and 15 ml. of benzene is added dropwise with stirring at approximately 20~25° C. over 1 hour. And, into the resulting mixture is introduced additional dry acetylene gas at a flow rate of 100 ml./min. at 20~25° C. for 5 hours, while continuously stirring.

After completion of the reaction, the reaction mixture is outwardly cooled with ice-water, 200 ml. of a cold saturated aqueous ammonium chloride solution is gradually added dropwise and the resulting mixture is made acidic with addition of 3% aqueous hydrochloric acid. The aqueous layer is separated therefrom, extracted with ether and the combined ether extract is washed with water, dried over anhydrous sodium sulfate and then the ether is distilled off under reduced pressure to leave 3.1 g. of an oily substance. The substance is then recrystallized from n-hexane to give 2.66 g. of the desired product as needles melting at 172~174° C. Further, the mother liquor is chromatographed on alumina (Woelm grade III) and from the benzene eluate is obtained additional amount of 0.18 g. of the desired product. Total yield: 2.84 g.; about 87% (based on the theoretical yield).

Analysis.—Calculated for $C_{21}H_{28}O_2$: C, 80.73; H, 9.03. Found: C, 80.46; H, 8.90.

EXAMPLE 5

17α-Chloroethynyl-17β,hydroxy-6β,19-oxido-3α,5-cyclo-5α-androstane

In a 100 ml. three-necked flask is placed 50 ml. of liquid ammonia and then, while stirring, 20 mg. of ferric nitrate is added thereto. Thereafter, to the resulting mixture is added portionwise 640 mg. of metallic sodium and, when the color shade of the solution will be changed from blue to grey after 40 minutes, the resulting solution is cooled to −60° C. Then, a solution of 1.36 g. of trans ethylene dichloride in 2 ml. of dry ether is added dropwise over 15 minutes. After completion of the dropwise-addition, the resulting mixture is refluxed for 30 minutes and a solution of 2 g. of 6β,19-oxido-3α,5-cyclo-5α-androstane-17-one in 24 ml. of anhydrous tetrahydrofuran is added dropwise over 15 minutes. The resulting mixture is then heated under reflux for 3 hours. After completion of the reaction, 3.2 g. of ammonium chloride is added to the resulting mixture, which is allowed to stand at room temperature, thereby being evaporated liquid ammonia. To the residue thus obtained is added water and the mixture is extracted with ethyl acetate. The aqueous layer is once again extracted with ethyl acetate. The combined extract is washed with water twice, dried over anhydrous sulfate, and the solvent is distilled off to give 2.2 g. of a crystalline substance. The substance thus obtained is recrystallized from ether to give 1.76 g. of the desired product as needles melting at 214~215° C. From the mother liquor is further obtained an additional amount of 0.41 g. of the desired product. Total yield: 2.19 g. (89%, based upon the theoretical yield).

Analysis.—Calculated for $C_{21}H_{27}O_2Cl$: C, 72.71; H, 7.85. Found: C, 72.48; H, 7.92.

What is claimed is:

1. A compound selected from the class of the compounds having the formula

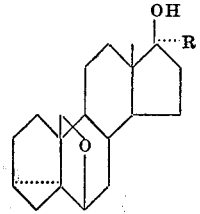

wherein R represents an alkyl group containing 1–6 carbon atoms, an alkenyl group containing 2–6 carbon atoms, an alkynyl group containing 2–6 carbon atoms or a halogenoethynyl group.

2. 17α - methyl - 17β-hydroxy - 6β,19 - oxido - 3α,5-cyclo-5α-androstane.

3. 17α-ethyl - 17β - hydroxy - 6β,19 - oxido - 3α,5-cyclo-5α-androstane.

4. 17α-(2' - propenyl) - 17β - hydroxy - 6β,19 - oxido-3α,5-cyclo-5α-androstane.

5. 17α - ethynyl - 17β - hydroxy - 6β,19 - oxido - 3α,5-cyclo-5α-androstane.

6. 17α - chloroethynyl - 17β - hydroxy - 6β,19 - oxido-3α,5-cyclo-5α-androstane.

7. A process for preparing a compound having the formula

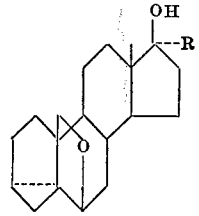

wherein R is alkyl of 1 to 6 carbon atoms, alkenyl of 2 to 6 carbon atoms, alkynyl of 2 to 6 carbon atoms or halogeno alkynyl of 2 to 6 carbon atoms, which comprises reacting 6β,19-oxido-3α,5-cyclo-5α-androstane-17-one with a compound having the formula.

RMgX wherein R is alkyl of 1 to 6 carbon atoms, alkenyl of 2 to 6 carbon atoms, alkynyl of 2 to 6 carbon atoms or halogeno alkynyl of 2 to 6 carbon atoms and X is a halogen atom, the aforesaid reaction being conducted at a temperature below about 70° C.

(References on following page)

References Cited

UNITED STATES PATENTS

| | | | |
|---|---|---|---|
| 3,117,143 | 1/1964 | Sollman | 260—397.4 |
| 3,141,016 | 7/1964 | Wettstein et al. | 260—239.55 |
| 3,242,197 | 3/1966 | Windholz et al. | 260—397.3 |
| 2,843,609 | 7/1958 | Colton | 260—397.5 |
| 3,068,249 | 12/1962 | Colton | 260—397.5 |

FOREIGN PATENTS 1,353,691  1/1964  France.

OTHER REFERENCES

Sollman, J. Org. Chem., 28, pp. 3559–3562 (1963).

H. A. FRENCH, *Primary Examiner.*